US008934427B2

United States Patent
Lee et al.

(10) Patent No.: US 8,934,427 B2
(45) Date of Patent: Jan. 13, 2015

(54) METHOD AND DEVICE FOR GENERATING REFERENCE SIGNAL IN CELLULAR MOBILE COMMUNICATION SYSTEM

(75) Inventors: Hyo Jin Lee, Seoul (KR); Youn Sun Kim, Gyeonggi-do (KR); Jin Kyu Han, Seoul (KR); Joon Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 391 days.

(21) Appl. No.: 13/361,195

(22) Filed: Jan. 30, 2012

(65) Prior Publication Data

US 2012/0195271 A1  Aug. 2, 2012

(30) Foreign Application Priority Data

Jan. 28, 2011 (KR) .................. 10-2011-0009109
Oct. 7, 2011 (KR) .................. 10-2011-0102303

(51) Int. Cl.
  *H04Q 7/00* (2006.01)
  *H04L 5/00* (2006.01)
(52) U.S. Cl.
  CPC ..................................... *H04L 5/003* (2013.01)
  USPC .......................................... 370/329; 370/203
(58) Field of Classification Search
  CPC ....................................................... H04B 7/024
  USPC .................. 370/329; 375/299; 455/452.1
  See application file for complete search history.

(56) References Cited

U.S. PATENT DOCUMENTS

| 8,284,722 B2 | 10/2012 | Park et al. |
| 2010/0091713 A1 | 4/2010 | Bui |
| 2011/0299573 A1* | 12/2011 | Sun et al. ...................... 375/219 |
| 2012/0176884 A1* | 7/2012 | Zhang et al. .................. 370/203 |

FOREIGN PATENT DOCUMENTS

| KR | 1020090028384 | 3/2009 |
| KR | 1020100120607 | 11/2010 |
| KR | 1020100137391 | 12/2010 |

* cited by examiner

*Primary Examiner* — Wanda Z Russell
(74) *Attorney, Agent, or Firm* — The Farrell Law Firm, P.C.

(57) ABSTRACT

Methods and apparatus are provided for transmitting and receiving reference signals through distributed antennas deployed within a service area of a base station in a mobile communication system. First control information, including at least two scrambling factor combinations, is received at a terminal from the base station. Second control information, indicating one of the at least two scrambling factor combinations, is received at the terminal from the base station. The one of the at least two scrambling factor combinations is selected based on the second control information. An initial value of a demodulation reference signal sequence is calculated using the selected scrambling factor combination. The demodulation reference signal sequence is received using the initial value.

16 Claims, 11 Drawing Sheets

PDSCH

220 —  DM-RS for ports 7, 8, 11, 13

221 —  DM-RS for ports 9, 10, 12, 14

CRS

Control Channel

METHOD AND DEVICE FOR GENERATING REFERENCE SIGNAL IN CELLULAR MOBILE COMMUNICATION SYSTEM

PRIORITY

This application claims priority under 35 U.S.C. §119(a) to applications filed in the Korean Intellectual Property Office on Jan. 28, 2011 and Oct. 7, 2011, and assigned Serial Nos. 10-2011-0009109 and 10-2011-0102303, respectively, the contents of which are incorporated herein by reference.

BACKGROUND OF THE INVENTION

1. Field of the Invention

The present invention relates generally to reference signal generation in a cellular mobile communication system, and more particularly, to efficient reference signal generation in a cellular mobile communication system based on a Distributed Antenna System (DAS).

2. Description of the Related Art

Mobile communication systems have evolved into a high-speed, high-quality wireless packet data communication systems that provide data and multimedia services that are far beyond the early voice-oriented services. Various mobile communication standards, such as, for example, High Speed Downlink Packet Access (HSDPA), High Speed Uplink Packet Access (HSUPA), Long Term Evolution (LTE), LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in Institute of Electrical and Electronic Engineers (IEEE), have been developed to support the high-speed, high-quality wireless packet data communication services. Particularly, LTE is a most promising technology that is capable of facilitating the high speed packet data transmission and maximizing the throughput of the radio communication system with various radio access technologies. LTE-A is the evolved version of LTE, which was developed to improve the data transmission capability.

The existing $3^{rd}$ generation wireless packet data communication systems, such as, for example, HSDPA, HSUPA and HRPD, use technologies such as Adaptive Modulation and Coding (AMC) and Channel-Sensitive Scheduling (CSS) to improve the transmission efficiency. With the use of AMC, a transmitter can adjust the amount of transmission data according to the channel state. Specifically, when the channel state is not 'Good', the transmitter reduces the amount of transmission data to adjust the reception error probability to a desired level. When the channel state is 'Good', the transmitter increases the amount of transmission data to adjust the reception error probability to the desired level, thereby efficiently transmitting a large volume of information. With the use of a Channel-Sensitive Scheduling-based resource management method, the transmitter selectively services the user having a better channel state among several users, thus, increasing system capacity as compared to a method of allocating a channel to one user and servicing the user with the allocated channel. Such a capacity increase is referred to as 'multi-user diversity gain'. In sum, the AMC technique and the Channel-Sensitive Scheduling method are each a method of applying an appropriate modulation and coding scheme at a most-efficient time determined depending on partial channel state information fed back from a receiver.

When used with Multiple Input and Multiple Output (MIMO), the AMC technique can be used to determine a number of spatial layers for transmission or rank. In this case, the AMC scheme is implemented in consideration of the number of layers to be used in MIMO transmission as well as the coding rate and modulation level.

There has been much research conducted to adopt Orthogonal Frequency Division Multiple Access (OFDMA) to next generation communication systems in place of Code Division Multiple Access (CDMA), which has been used in $2^{nd}$ and $3^{rd}$ Generation mobile communication systems. The standardization organizations such as 3GPP, 3GPP2, and IEEE are developing standards for an enhanced system based on the OFDMA or modified OFDMA. OFDMA promises to increase system capacity as compared to CDMA. One of the factors affecting the increase in system capacity in an OFDMA system is the use of frequency domain scheduling. As a channel sensitive scheduling technique uses a time-varying channel for capacity gain, it is possible to increase the capacity gain with a frequency-varying channel characteristic.

The conventional cellular communication system is composed of a plurality of cells, as shown in FIG. 1, to provide mobile communication services with the above-described techniques. FIG. 1 is a diagram illustrating a cellular mobile communication system composed of three cells, each centered around a transmit/receive antenna.

Referring to FIG. 1, the mobile communication system includes a plurality of cells 100, 110, and 120, each centered around an antenna 130, and first and second User Equipment (UEs) 140 and 150. The eNB serves the first and second UEs 140 and 150 within the cells 100, 110, and 120 to provide a mobile communication service. Within the cell defined as the service area of the eNB using the antenna 130, the first UE 140 is served at relatively low data rate as compared to the second UE 150, since the first UE 140 is more distant from the antenna 130 than the second UE 150.

As shown in FIG. 1, the formation of the antenna arranged at the center of a cell is referred to as Central Antenna System (CAS) in mobile communication systems. In the case of a CAS, even when multiple antennas are provided, all of these antennas are arranged at the center of the cell to define the service area. In a mobile communication system implemented with the CAS-based antenna formation as shown in FIG. 1, each eNB has to transmit reference signals for the UE to measure downlink channel state and modulate downlink signals. In the case of 3GPP LTE-A, the UE estimates a channel with a Demodulation Reference, Signal (DM-RS) and measures a channel state between the eNB and the UE based on Channel Status Information Reference Signal (CSI-RS). The DM-RS and CSI-RS are transmitted by eNB.

FIG. 2 is a diagram illustrating a downlink reference signal structure with DM-RS and CSI-RS transmitted from eNB to UE in an LTE-A system.

In FIG. 2, reference numbers 220 and 221 denote locations of DM-RS for four antenna ports, respectively. Specifically, the DM-RS for ports 7, 8, 11, and 13 are transmitted at the locations denoted by reference number 220, and the DM-RS for ports 9, 10, 12, and 14 are transmitted at the locations denoted by reference number 221. In order to discriminate among the DM-RSs mapped to the same location, Code Division Multiplexing (CDM) is used with the codes assigned to the respective ports as shown in Table 1 below.

TABLE 1

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |

TABLE 1-continued

| Antenna port p | $[\overline{w}_p(0)\ \overline{w}_p(1)\ \overline{w}_p(2)\ \overline{w}_p(3)]$ |
| --- | --- |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DM-RS number at the positions for DM-RS ports is defined by Equation (1), as set forth below:

$$r(m) = \frac{1}{\sqrt{2}}(1 - 2E\ c(2m)) + j\frac{1}{\sqrt{2}}(1 - 2E\ c(2m+1)), \quad (1)$$
$$m = 0, 1, \ldots, 12N_{RB}^{max,DL} - 1$$

In Equation (1), $N_{RB}^{max,DL}$ denotes a number of Resource Blocks (RB) available in downlink, m denotes the sequence index, and the sequence indices of 12 DM-RS resources per RB for the DM-RS ports are mapped in a frequency preference manner as shown in FIG. 3. c(i) denotes a pseudo-random sequence having an initial value denoted by Equation (2) below:

$$c_{init} = ([n_s/2]+1)E(2N_{ID}^{cell}+1)E2^{16}+n_{SCID} \quad (2)$$

where $N_{ID}^{cell}$ denotes a cell ID, and $n_{SCID}$ denotes scrambling identity information provided by a scrambling identity field of DCI format 2b or 2C transmitted in PDCCH which is set to 0 or 1. Since the antenna ports of the same cell have the same cell ID, the DM-RS sequences of the antenna ports are discriminated by $n_{SCID}$.

Referring again to FIG. 2, the signals for two CSI-RS antenna ports can be mapped to the locations denoted by reference numbers 200 to 219, respectively. Specifically, the eNB transmits the CSI-RSs for two antenna ports at a location denoted by reference number 200 in order for the UE to measure downlink. In the case of the cellular system having multiple cells as shown in FIG. 2, CSI-RSs can be transmitted in different locations. For example, a CSI-RS for the cell 100 can be transmitted at a location denoted by the reference number 200, a CSI-RS for the cell 110 at a location denoted by the reference number 205, and a CSI-RS for the cell 120 at location denoted by the reference number 210. By allocating different time-frequency resources, it is possible to avoid radio interference among the CSI-RSs for different cells.

The CSI-RS sequence transmitted at a location mapped for a CSI-RS port is defined by Equation (3) below:

$$r_{l,n_s}(m) = \frac{1}{\sqrt{2}}(1 - 2E\ c(2m)) + j\frac{1}{\sqrt{2}}(1 - 2E\ c(2m+1)), \quad (3)$$
$$m = 0, 1, \ldots, N_{RB}^{max,DL} - 1$$

In Equation (3), c(i) denotes a pseudo-random sequence of which an initial value is defined by Equation (4) below:

$$c_{init} = 2^{10} \cdot (7 \cdot (n_s+1)+l+1) \cdot (2 \cdot N_{ID}^{cell}+1)+2 \cdot N_{ID}^{cell}+N_{CP} \quad (4)$$

In Equation (4), l denotes an OFDM symbol order in a slot, $N_{CP}$ denotes the length of Cyclic Prefix (CP) for use in the corresponding cell and which is set to 0 or 1.

In the case of the CAS-based system as shown in FIG. 1, the transmit/receive antennas of an eNB are arranged at the center of the cell, such that the communication service to the UE located far from the cell's center is limited in its data rate. Thus, high data rate service is limited to the UEs located near or around the center of the cell in the CAS-based system. Specifically, the conventional cellular mobile communication system has a drawback in that the UEs located at the cell boundary cannot be served at a high data rate, while the UEs located near the cell's center can be served in this manner.

SUMMARY OF THE INVENTION

The present invention has been made to address at least the above problems and/or disadvantages and to provide at least the advantages described below. Accordingly, an aspect of the present invention provides a DAS for LTE-A and provides a DM-RS generation method and apparatus for supporting DAS with efficient management of distributed, antennas.

In accordance with an aspect of the present invention, a method is provided for receiving reference signals at a terminal through distributed antennas deployed within a service area of a base station in a mobile communication system. First control information, including at least two scrambling factor combinations, is received from the base station. Second control information, indicating one of the at least two scrambling factor combinations, is received from the base station. The one of the at least two scrambling factor combinations is selected based on the second control information. An initial value of a demodulation reference signal sequence is calculated using the selected scrambling factor combination. The demodulation reference signal sequence is received using the initial value.

In accordance with another aspect of the present invention, a method is provided for transmitting reference signals from a base station through distributed antennas deployed within a service area of the base station in a mobile communication system. First control information, including at least two scrambling factor combinations, is transmitted to a terminal. Second control information, indicating one of the at least two scrambling factor combinations, is transmitted to the terminal. A demodulation reference signal sequence is generated using the one of the at least two scrambling factor combinations. The demodulation reference signal sequence is transmitted to the terminal.

In accordance with an additional aspect of the present invention, a terminal is provided for receiving reference signals transmitted by a base station through distributed antennas deployed within a service area of the base station in a mobile communication system. The terminal includes a radio communication unit that receives first control information, including at least two scrambling factor combinations, and second control information, indicating one of the at least two scrambling factor combinations, from the base station. The terminal also includes a control unit that selects the one of the at least two scrambling factor combinations based on the second control information, calculates an initial value of a demodulation reference signal sequence using the selected scrambling factor combination, and receives the demodulation reference signal sequence using the initial value.

In accordance with a further aspect of the present invention, a base station is provided for transmitting reference signals through distributed antennas deployed within a service area of the base station in a mobile communication system. The base station includes a control unit that generates first control information, including at least two scrambling factor combinations, and second control information, indicating one of the at least two scrambling factor combinations, and generates a demodulation reference signal sequence using the one of the at least two scrambling factor combinations. The base station also includes a transmitter that transmits the first control information, the second control information, and the demodulation reference signal sequence to the terminal.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
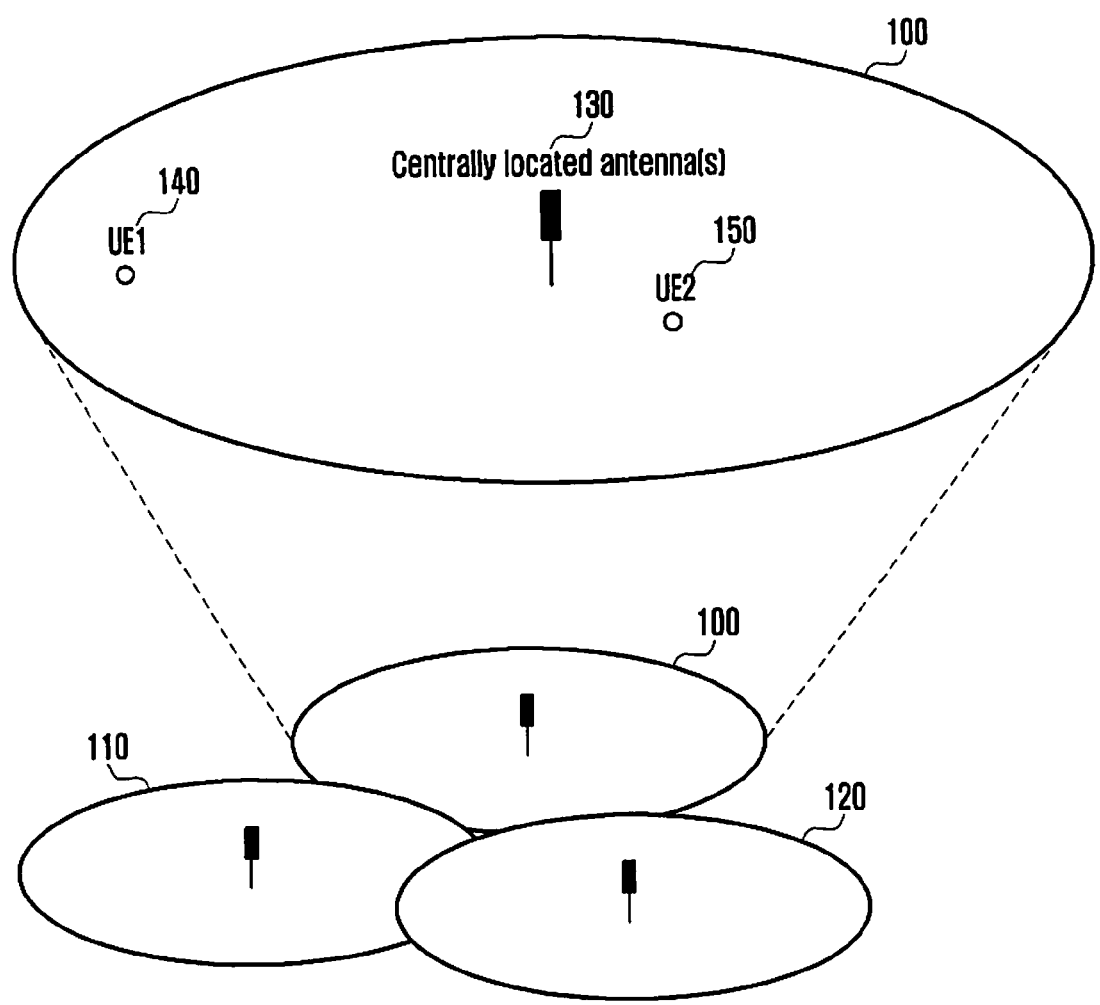
FIG. 1 is a diagram illustrating a cellular mobile communication system composed of three cells each centered around a transmit/receive antenna.
Figure 2:
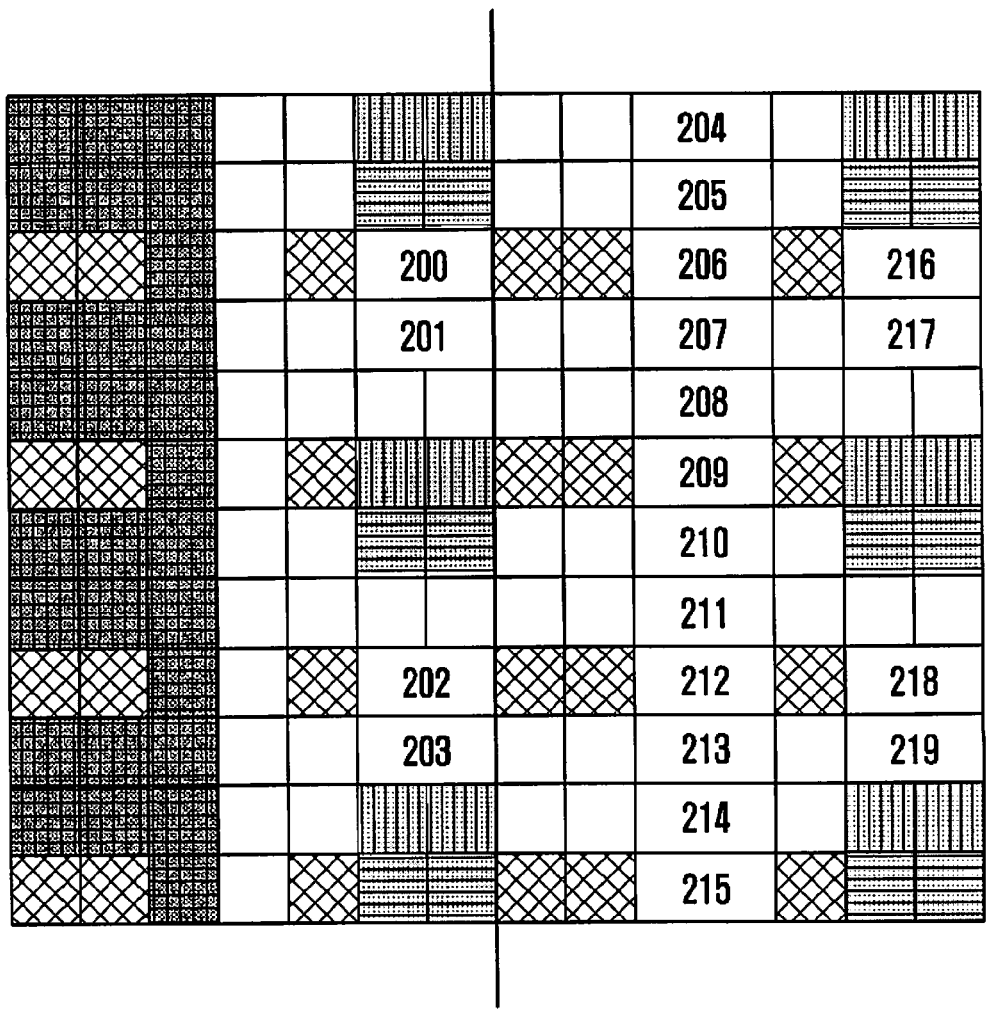
FIG. 2 is a diagram illustrating a downlink reference signal structure with DM-RS and CSI-RS transmitted from eNB to UE in an LTE-A system.
Figure 2:
Figure 2:
Figure 2:
Figure 2:
Figure 2:
Figure 3:
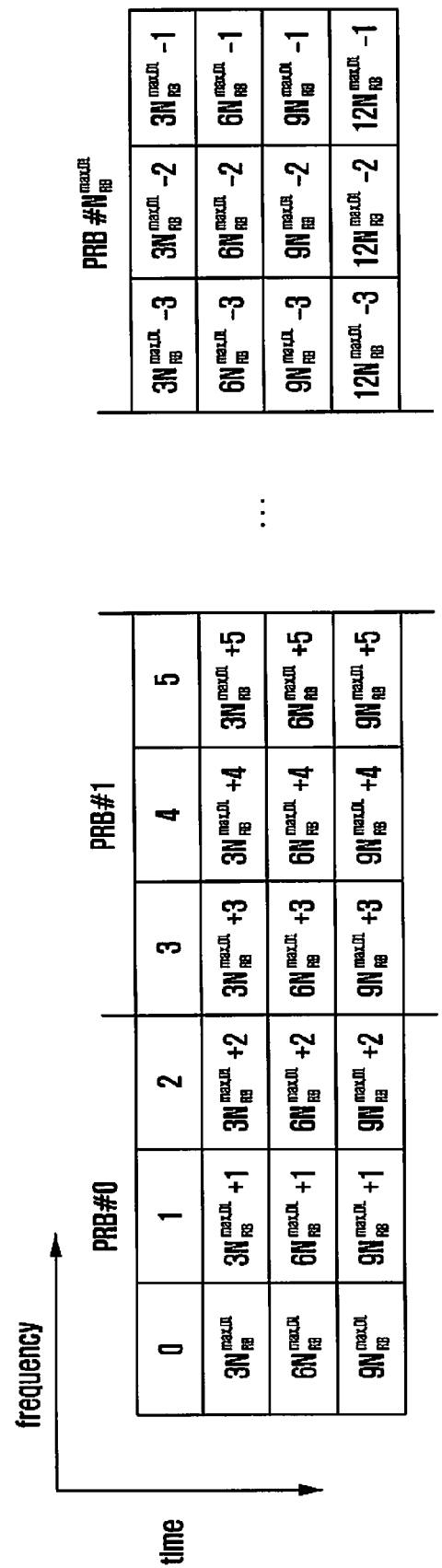
FIG. 3 is a diagram illustrating a mapping of DM-RS sequences to a DM-RS resource, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Further, the following terms are defined in consideration of the functionality in embodiments of the present invention, and may vary according to the intention of a user or an operator, usage, etc. Therefore, the definition should be made on the basis of the overall content of embodiments of the present specification.

Although a detailed description of embodiments of the present invention is provided herein with reference to an OFDM-based mobile communication system, such as, for example, 3GPP Evolved Universal Terrestrial Radio Access (EUTRA) standard, it will be understood by those skilled in the art that embodiments of the present invention can be applied to other communication systems having a similar technical background and channel format, with slight modification, without departing from the spirit and scope of embodiments of the present invention.

Typically, a cellular mobile communication system is implemented by deploying a plurality of cells in a restricted area. Each cell is formed by a base station facility placed at the center to provide a mobile communication service. The base station facility includes the antennas for transmitting/receiving radio signals and a signal processing part to provide the mobile communication service to the UEs within the cell. A system in which the antennas are concentrated at the center of the system is referred to as CAS, and most mobile communication systems belong in this category.

A DAS is opposite to the CAS in concept. The DAS is built with the antennas distributed in the cell, i.e., service area of an eNB, so as to provide an improved mobile communication service as compared to the CAS. Embodiments of the present invention provide a DAS-based mobile communication system that is capable of distributing antennas within the service area of each eNB to maximize RS resource efficiency by generating a DM-RS that is optimized for DAS. Embodiments of the present invention provide a method and device for generating a DM-RS for supporting a DAS with efficient management of antennas distributed within the service area of the eNB in a cellular mobile communication system.

As aforementioned, the data rate available for users is highly dependent on the location of the UE within the service area of the eNB in the CAS-based cellular communication system. Thus, the UE located at the cell edge cannot be served at a high data rate, which is available for the UE located around the center of the cell. Embodiments of the present invention provide a DAS-based cellular mobile communication system to solve this problem.

Figure 4:
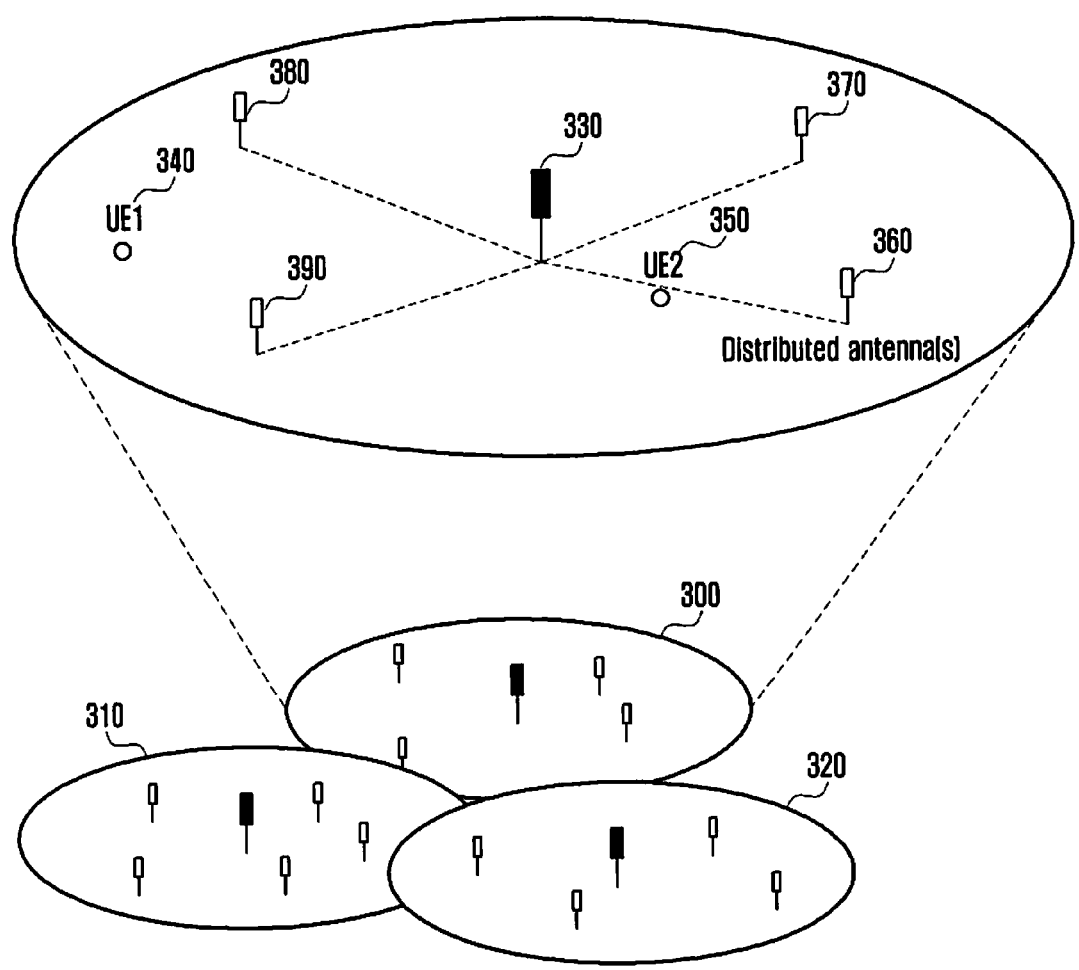
FIG. 4 is a diagram illustrating an architecture of a mobile communication system, according to an embodiment of the present invention.

FIG. 4 is a diagram illustrating an architecture of a mobile communication system, according to an embodiment of the present invention. The description is directed to a mobile communication system composed of three cells. Each cell corresponds to a service area centered around an eNB, from which multiple antennas are distributed within the service area.

Referring to FIG. 4, the mobile communication system, according to an embodiment of the present invention, includes a plurality of cells 300, 310, and 320, and each of which is centered around an eNB having a central antenna 330 and a plurality of distributed antennas 360, 370, 380, and 390, distributed therein to serve UEs 340 and 350 located within the service area. Each cell is assigned a cell ID. Thus, the central antenna 330 and the distributed antennas 360, 370, 380, and 390 use the same cell ID. The first and second UEs 340 and 350 are served by the eNB via at least one antenna selected from among the central and distributed antennas 330, 360, 370, 380, and 390 for uplink and downlink transmissions.

For example, the eNB can provide the first UE 340 with a mobile communication service via the distributed antennas 380 and 390, while it provides the second UE 350 with the mobile communication service via the central antenna 330. If the mobile communication system operates in a CAS mode, the first UE 340 is served at low data rate since it is located far from the central antenna 330. In a DAS mode, however, the first UE 340 can be served at relatively high data rate via the nearest distributed antennas 380 and 390.

Figure 5:
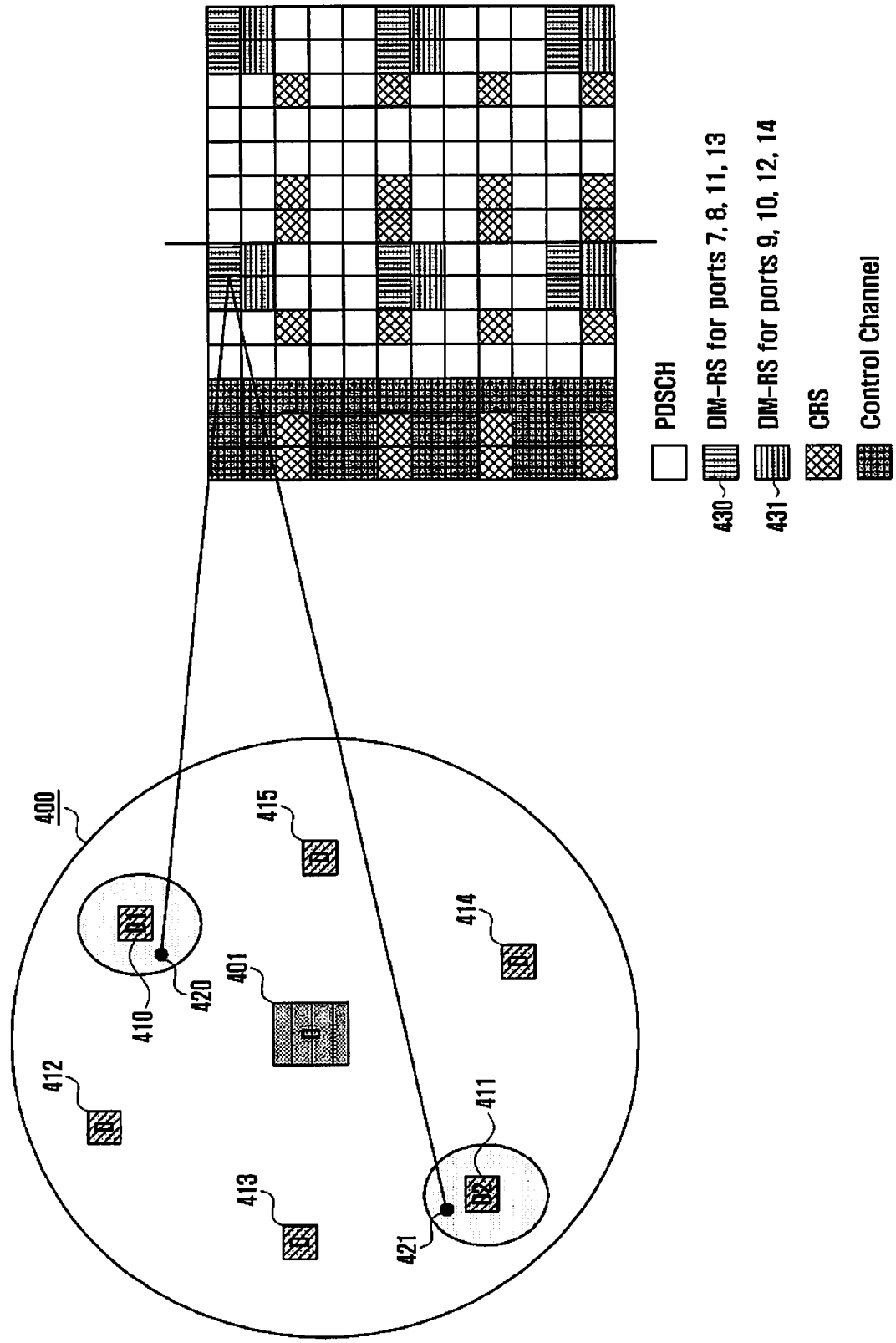
FIG. 5 is a diagram illustrating a DM-RS generation method, according to an embodiment of the present invention.

FIG. 5 is a diagram illustrating a DM-RS generation method, according to an embodiment of the present invention.

Referring to FIG. 5, a DAS-enabled cell 400 includes a central antenna 401 of the eNB and a plurality of distributed antennas 410, 411, 412, 413, 414, and 415 of the eNB, which are distributed within the service area. A first UE 420 receives downlink information via the distributed antenna 410, and a second UE 421 receives downlink information via the distributed antenna 411. The downlink transmissions to both the first and second UEs 410 and 411 are scheduled in the same RB at the same time. If the DM-RS sequence is calculated using Equation (1) as in LTE-A, the two UEs receiving the downlink information in the same RB with the same $n_{SCID}$ will experience significant interference from each other due to the use of an identical DM-RS resource and sequence. Since it is difficult to expect efficient resource utilization with the LTE-A downlink DM-RS transmission scheme, which is designed in consideration of CAS environment, there is a need for a downlink DM-RS generation method that is capable of allocating the resource to the UEs using different distributed antennas in the same RB in consideration of the DAS environment.

Downlink DM-RS generation methods for the DAS, which are capable of transmitting the data for multiple UEs in the same RB via multiple antennas selected among the central and distributed antennas of the eNB, are described in detail below. The DM-RS generation methods discriminate among the DM-RSs by adding DM-RS sequences using at least two scrambling parameters. Specifically, the eNB determines at least two scrambling parameters for the UEs in association with the distributed antennas deployed in the service area. The eNB generates the DM-RS sequence for each antenna by combining the scrambling parameters. The eNB also transmits the DM-RS sequences through corresponding antennas.

The DM-RS generation method, according to an embodiment of the present invention, is characterized by scrambling with a unique UE ID $n_{RNTI}$ assigned by the eNB in addition to the scrambling of DM-RS sequence with $n_{SCID}$, as shown in Equation (1). This method is capable of using more diverse DM-RS sequences in DAS as compared to CAS. In this embodiment of the present invention, the DM-RS sequence is generated as set forth in Equation (5) below:

$$r(m) = \frac{1}{\sqrt{2}}(1 - 2\mathrm{E}\ c(2m)) + j\frac{1}{\sqrt{2}}(1 - 2\mathrm{E}\ c(2m+1)), \quad (5)$$

$$m = 0, 1, \ldots, 12N_{RB}^{max,DL} - 1$$

In Equation (5), c(i) denotes a pseudo-random sequence of which an initial value is defined by Equation (6) below:

$$c_{init} = (\lfloor n_s/2 \rfloor + 1) \cdot (2N_{ID}^{cell} + 1) \cdot 2^{16} + f(n_{SCID}, [n_{RNTI} \bmod G]) \quad (6)$$

G denotes a number of sequences to be added by using nRNTI, f(a,b) is a function generating 2×G different values by input of a set to 0 or 1 and b having a value in the range from 0 to G−1. In Equation (6), $f(n_{SCID},[n_{RNTI} \bmod G])=[n_{RNTI} \bmod G] \cdot 2 + n_{SCID}$ can be considered as an example of f(a,b). This method guaranteed that the value of G is available by taking notice of the fact nSCID can be set to only 0 or 1. This method can be generalized as $f(n_{SCID}, [n_{RNTI} \bmod G])= [n_{RNTI} \bmod G] \cdot 2^n + n_{SCID}$, where n is a value less than 16. In Equation (6), the reason why the mod G is introduced as the initial value of the sequence is to facilitate interference measurement by limiting the number of DM-RSs for different UEs in the same RB, since the large G increases the interference measurement complexity and improbability as well as the number of available DM-RSs. The value of G can be predetermined or notified to the UEs within the cell through broadcast channel by the eNB.

If the newly introduced initial value of scrambling is used, as shown in Equation (6), the LTE Release 9 or 10 UE cannot recognize the new scrambling. Accordingly, even though the new scrambling-enabled UE and legacy UE are allocated respective ports 7 and 8 using orthogonal sequences as shown in Table 1, the orthogonality is not guaranteed due to different scramblings. Therefore, there is a need for a method for supporting efficient Multiuser Multiple Input Multiple Output (MU-MIMO) by guarantying orthogonality between ports 7 and 8 for the legacy and new UEs.

In order to achieve this goal, a dynamic switching can be considered to apply the legacy scrambling scheme for the MU-MIMO of new scrambling-enabled UE and legacy UE and the new scrambling scheme for the MU-MIMO of only the new scrambling-enabled UEs. The downlink control information transmitted in downlink control channel includes a bit indicating whether to use legacy scrambling or new scrambling in order for the UE to select the scrambling scheme. The new scrambling has the initial value calculated by Equation (6), and the legacy scrambling has the initial value calculated by Equation (2). The information on the scrambling to be applied can be included in the control information on the downlink scheduling, such as resource allocation and MCS.

Figure 6:
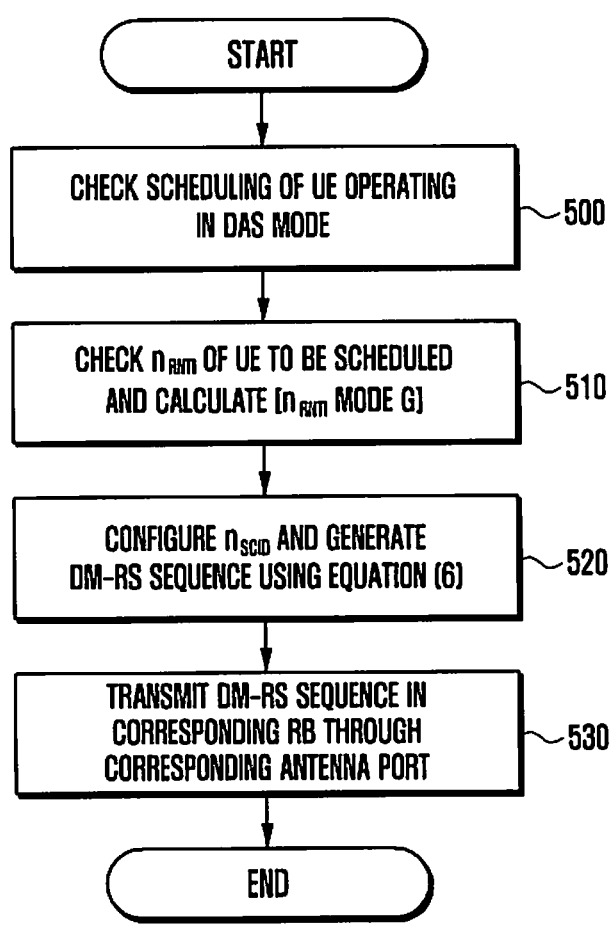
FIG. 6 is a flowchart illustrating an eNB procedure for generating a DM-RS sequence, according to an embodiment of the present invention.

FIG. 6 is a flowchart illustrating an eNB procedure for generating a DM-RS sequence, according to an embodiment of the present invention.

Referring to FIG. 6, the eNB checks scheduling for the UEs operating in DAS mode, in step 500. Specifically, the eNB checks the UEs to be scheduled with corresponding antennas. Next, the eNB checks the $n_{RNTI}$ of the UE to be scheduled and calculates [$n_{RNTI}$ mode G], in step 510. Specifically, the eNB determines the [$n_{RNTI}$ mode G] calculated with UE's $n_{RNTI}$ value and mode G as scrambling parameters. The eNB configures $n_{SCID}$ and generates a DM-RS sequence for the corresponding UE using Equation (6), in step 520. $n_{SCID}$ is configured so as not to cause a collision in consideration of $n_{RNTI}$ values of other UEs scheduled in the same RB. Specifically, the eNB determines $n_{SCID}$ as a scrambling parameter. The eNB combines $n_{SCID}$ and [$n_{RNTI}$ mode G] to generate a DM-RS sequence for the corresponding UE. The eNB transmits the DM-RS sequence in the corresponding RB through a corresponding antenna port, in step 530, thereby completing the DM-RS generation and transmission procedure. The UE estimates a channel using the DM-RS by taking notice of the new scrambling scheme with [nRNTI mode G]. A description of the DM-RS generation procedure of an eNB, which switches between the new and legacy scrambling schemes, is provided in detail below with reference to FIG. 10.

The DM-RS generation method according to another embodiment of the present invention is characterized by scrambling the DM-RS sequence with dynamic control information in addition to $n_{SCIP}$ for LTE-A. Unlike the previous embodiment, in which nRNTI is used as semi-static information, the DM-RS transmission generation method of this embodiment can perform DM-RS scrambling and DM-RS antenna port designation simultaneously based on the dynamic control information, so as to generate diverse DM-RS sequences for the DAS. With the introduction of DM-RS sequence scrambling based on the dynamic control information, it is possible to more effectively prevent a DM-RS sequence from being assigned for different distributed antennas, as compared to when semi-static information is used.

As aforementioned, LTE-A uses $n_{SCID}$, which can be set to 0 or 1, to support two DM-RS sequences. Three bits of the downlink control information are defined as shown in Table 2 below.

TABLE 2

| | One Codeword | | Two Codewords |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports-7-14 |

When not listed in Table 2, $n_{SCID}$ is always set to 0.

The DM-RS generation method, according to this embodiment of the present invention, is capable of utilizing $n_{SCID}$ more efficiently to support DM-RS transmission through more distributed antennas, and introduces a new parameter $n_{SCID2}$. In this embodiment of the present invention, the number of layers to be used for data transmission through the distributed antennas is limited to secure available DM-RS sequences. When the number of layers for use of distributed antennas is limited to 4, the DM-RS can be generated in accordance with Table 3 below.

TABLE 3

| Value | One CW | | Two CW | |
|---|---|---|---|---|
| | 1 layer, port 7, $n_{SCID} = 0$ | $n_{SCID2} = 0$ | 2 layer, port 7-8, $n_{SCID} = 0$ | $n_{SCID2} = 0$ |
| | 1 layer, port 7, $n_{SCID} = 1$ | | 2 layer, port 7-8, $n_{SCID} = 1$ | |
| | 1 layer, port 8, $n_{SCID} = 0$ | | 3 layer, port 7-9, $n_{SCID} = 0$ | |
| | 1 layer, port 8, $n_{SCID} = 1$ | | 3 layer, port 7-9, $n_{SCID} = 1$ | |
| | 2 layer, port 7-8, $n_{SCID} = 0$ | | 4 layer, port 7-10, $n_{SCID} = 0$ | |
| | 2 layer, port 7-8, $n_{SCID} = 1$ | | 4 layer, port 7-10, $n_{SCID1} = 1$ | |
| | 3 layer, port 7-9, $n_{SCID} = 0$ | | 5 layer, port 7-11, $n_{SCID} = 0$ | |
| | 4 layer, port 7-10, $n_{SCID} = 0$ | | 6 layer, port 7-12, $n_{SCID} = 0$ | |
| | 1 layer, port 7, $n_{SCID} = 0$ | $n_{SCID2} = 1$ | 7 layer, port 7-13, $n_{SCID} = 0$ | |
| | 1 layer, port 7, $n_{SCID} = 1$ | | 8 layer, port 7-14, $n_{SCID} = 0$ | |
| 0 | 1 layer, port 8, $n_{SCID} = 1$ | | 2 layer, port 7-8, $n_{SCID} = 0$ | $n_{SCID2} = 0$ |
| 1 | 1 layer, port 8, $n_{SCID} = 0$ | | 2 layer, port 7-8, $n_{SCID} = 1$ | |
| 2 | 2 layer, port 7-8, $n_{SCID} = 0$ | | 3 layer, port 7-9, $n_{SCID} = 0$ | |
| 3 | 2 layer, port 7-8, $n_{SCID} = 1$ | | 3 layer, port 7-9, $n_{SCID} = 1$ | |
| 4 | 3 layer, port 7-9, $n_{SCID} = 0$ | | 4 layer, port 7-10, $n_{SCID} = 0$ | |
| 5 | 4 layer, port 7-10, $n_{SCID} = 0$ | | 4 layer, port 7-10, $n_{SCID} = 1$ | |

In Table 2, $n_{SCID}$ is set to 0 when one codeword is transmitted on two layers and two codewords are transmitted on three or four layers for LTE-A. This setting is due to the design made in consideration of the MU-MIMO characteristic of the LTE-A system. However, it is necessary to use $n_{SCID}$ more thoroughly with the number of layers of limited distributed antennas in the DAS environment. The cases of using $n_{SCID}$ set to 1 are added in Table 3. Also, with the introduction of nSCID2, it becomes possible to increase the number of available DM-RS sequences.

Although the number of layers for transmissions through distributed antennas is limited to 4 in Table 3, it can be designed to support a fewer number of layers for reducing distributed antenna installation cost. If the number of layers for transmission through distributed antennas is limited to 2, DM-RS can be generated with Table 4.

TABLE 4

| | One CW | | Two CW | |
|---|---|---|---|---|
| 0 | 1 layer, port 7, $n_{SCID} = 0$ | $n_{SCID2} = 0$ | 2 layer, port 7-8, $n_{SCID} = 0$ | $n_{SCID2} = 0$ |
| 1 | 1 layer, port 7, $n_{SCID} = 1$ | | 2 layer, port 7-8, $n_{SCID} = 1$ | |
| 2 | 1 layer, port 8, $n_{SCID} = 0$ | | 3 layer, port 7-9, $n_{SCID} = 0$ | |
| 3 | 1 layer, port 8, $n_{SCID} = 1$ | | 4 layer, port 7-10, $n_{SCID} = 0$ | |
| 4 | 2 layer, port 7-8, $n_{SCID} = 0$ | | 5 layer, port 7-11, $n_{SCID} = 0$ | |
| 5 | 2 layer, port 7-8, $n_{SCID} = 1$ | | 6 layer, port 7-12, $n_{SCID} = 0$ | |
| 6 | 3 layer, port 7-9, $n_{SCID} = 0$ | | 7 layer, port 7-13, $n_{SCID} = 0$ | |
| 7 | 4 layer, port 7-10, $n_{SCID} = 0$ | | 8 layer, port 7-14, $n_{SCID} = 0$ | |
| 8 | 1 layer, port 7, $n_{SCID} = 0$ | $n_{SCID2} = 1$ | 2 layer, port 7-8, $n_{SCID} = 0$ | $n_{SCID2} = 1$ |
| 9 | 1 layer, port 7, $n_{SCID} = 1$ | | 2 layer, port 7-8, $n_{SCID} = 1$ | |
| 10 | 1 layer, port 8, $n_{SCID} = 0$ | | 2 layer, port 7-8, $n_{SCID} = 0$ | $n_{SCID2} = 2$ |
| 11 | 1 layer, port 8, $n_{SCID} = 1$ | | 2 layer, port 7-8, $n_{SCID} = 1$ | |
| 12 | 1 layer, port 7, $n_{SCID} = 0$ | $n_{SCID2} = 2$ | 2 layer, port 7-8, $n_{SCID} = 0$ | $n_{SCID2} = 3$ |
| 13 | 1 layer, port 7, $n_{SCID} = 1$ | | 2 layer, port 7-8, $n_{SCID} = 1$ | |
| 14 | 1 layer, port 8, $n_{SCID} = 0$ | | 2 layer, port 7-8, $n_{SCID} = 0$ | $n_{SCID2} = 4$ |
| 15 | 1 layer, port 8, $n_{SCID} = 1$ | | 2 layer, port 7-8, $n_{SCID} = 1$ | |

In Table 4, the number of layers for distributed antennas is limited to 2 so as to increase the number of available $n_{SCID2}$ to 5, by adding one bit for transmission of two codewords. Due to the fact that the transmission of one codeword on multiple layers occurs only in the case of retransmission, it is designed to secure three available $n_{SCID2}$ values by extending $n_{SCID2}$ for one layer in case of transmitting one codeword. Specifically, the additional $n_{SCID2}$ values can be used, with the exception of the retransmission via distributed antennas after initial transmission via central antenna.

When Tables 3 or 4 are used to generate DM-RS, the DM-RS sequence is generated by Equation (7) set forth below:

$$r(m) = \frac{1}{\sqrt{2}}(1 - 2\mathrm{E}\ (2m)) + j\frac{1}{\sqrt{2}}(1 - 2\mathrm{E}\ c(2m+1)), \quad (7)$$

$$m = 0, 1, \ldots, 12N_{RB}^{max,DL} - 1$$

In Equation (7), c(i) denotes a pseudo-random sequence having an initial value defined by Equation (8) below:

$$c_{init} = (\lfloor n_s/2 \rfloor + 1) \cdot (2N_{ID}^{cell} + 1) \cdot 2^{16} + f(n_{SCID}, n_{SCID2}) \quad (8)$$

In Equation (8), $f(n_{SCID}, n_{SCID2})$ is a function generating an available value by combining $n_{SCID}$ and $n_{SCID2}$. $f(n_{SCID}, n_{SCID2})$ can be a function predetermined like $n_{SCID2} \cdot 2 + n_{SCID}$ or a function determined according to one or more values carried in the Radio Resource Control (RRC) signal transmitted from the eNB to the UE.

A function determined according to the RRC signal is described with reference to Table 3. The eNB transmits four values mapped by a combination of $n_{SCID}$ and $n_{SCID2}$ to the UE as shown in Table 3-1.

The UE checks the combination of $n_{SCID}$ and $n_{SCID2}$ scheduled through downlink control information and determines one of the four mapping values transmitted in the RRC signal by referencing Table 7-1 below. The UE determines the function value $f(n_{SCID},n_{SCID2})$ by using the values mapped to one of the four values carried in the RRC signal. The UE determines the value of $c_{init}$ used in DMRS transmission by applying Equation (8).

In Table 7-1, each element of the ordered pair transmitted by RRC signaling in correspondence to $(n_{SCID},n_{SCID2})$ is an integer value greater than or equal to 0. As an example, $f(n_{SCID},n_{SCID2})$ corresponding to (X, Y) in Table 3-1 can be $f(n_{SCID},n_{SCID2})=(\lfloor n_s/2 \rfloor+1) \cdot (-2N_{ID}^{cell}+2X) \cdot 2^{16}+Y$. This gives the effect that the parameter $N_{ID}^{cell}$ of Equation (2), determining the value of $C_{init}$ for DM-RS of the legacy LTE-A, is substituted by X, and $n_{SCID}$ by Y.

According to an embodiment of the present invention, the combination of (X, Y) in Table 3-1 can be provided to the UE through RRC signaling carrying only the value of X with fixed $Y=n_{SCID}$.

TABLE 3-1

| $(n_{SCID}, n_{SCID2})$ | (X, Y) |
|---|---|
| (0, 0) | (X0, Y0) |
| (0, 1) | (X1, Y1) |
| (1, 0) | (X2, Y2) |
| (1, 1) | (X3, Y3) |

Figure 7:
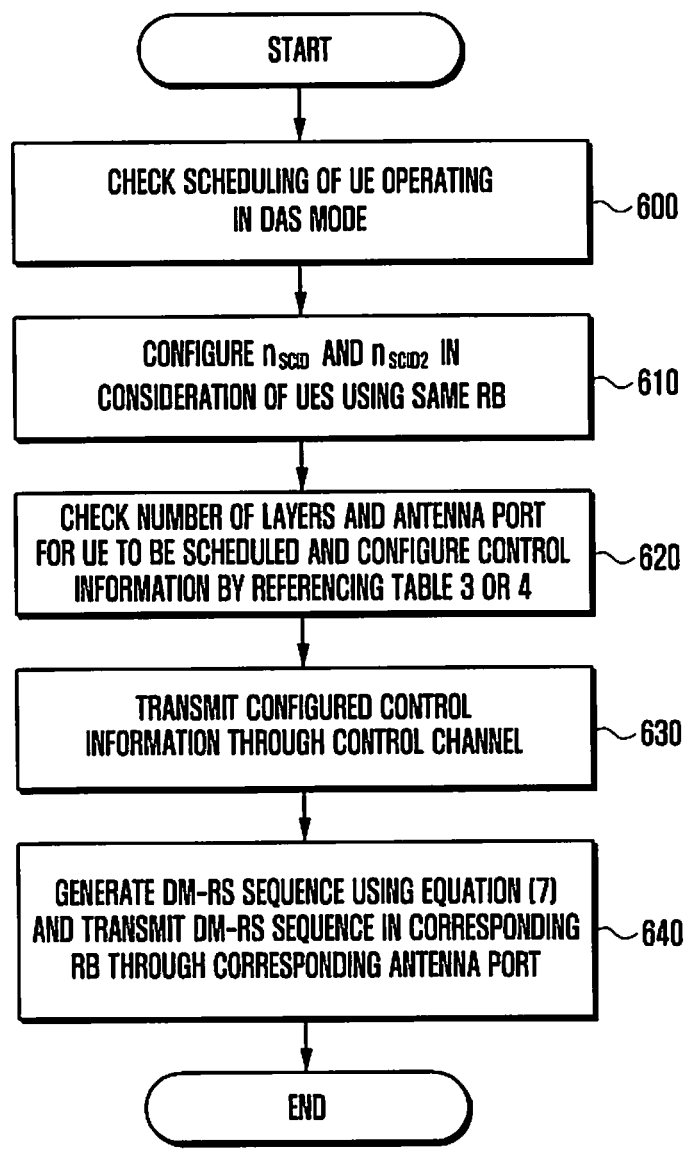
FIG. 7 is a flowchart illustrating an eNB procedure for generating a DM-RS sequence, according to an embodiment of the present invention.

FIG. 7 is a flowchart illustrating an eNB procedure for generating a DM-RS sequence, according to the embodiment of the present invention described with respect to FIG. 6.

Referring to FIG. 7, the eNB checks scheduling for the UEs operating in the DAS mode, in step 600. Specifically, the eNB checks the UEs to be scheduled with corresponding antennas. The eNB determines the scrambling parameters for the UE to be scheduled by taking notice of collision with other UEs using the same RB, in step 610. Specifically, the eNB configures $n_{SCID}$ and $n_{SCID2}$ as scrambling parameters. The eNB checks a number of layers and antenna ports for use by the UE to be scheduled, and configures control information by referencing Table 3 or 4, in step 620. Specifically, the eNB configures the control information with the scrambling parameters, number of layers, and antenna ports.

The eNB transmits the configured control information to the UE through a control channel, in step 630. The eNB generates a DM-RS sequence for the UE using Equation (7) and transmits the DM-RS sequence in the corresponding RB through a corresponding antenna port, in step 640. Specifically, the eNB combines $n_{SCID}$ and $n_{SCID2}$ to generate the DM-RS sequence and transmits the DM-RS sequence to the corresponding UE.

The DM-RS generation method, according to an additional embodiment of the present invention, differs from the previously described embodiment in that the additional $n_{SCID2}$ values are secured using a New Data Indicator (NDI) bit for non-activated codewords excluded in LTE-A for single codeword transmission.

In the DM-RS generation method, according to this embodiment of the present invention, if the number of layers for distributed antennas is limited to 4, DM-RS can be generated using Table 5 below.

TABLE 5

| value | One CW | | Two CW | |
|---|---|---|---|---|
| 0 | 1 layer, port 7, $n_{SCID} = 0$ | $n_{SCID2} = 0$ | 2 layer, port 7-8, $n_{SCID} = 0$ | $n_{SCID2} = 0$ |
| 1 | 1 layer, port 7, $n_{SCID} = 1$ | | 2 layer, port 7-8, $n_{SCID} = 0$ | |
| 2 | 1 layer, port 8, $n_{SCID} = 0$ | | 3 layer, port 7-9, $n_{SCID} = 0$ | |
| 3 | 1 layer, port 8, $n_{SCID} = 1$ | | 3 layer, port 7-9, $n_{SCID} = 0$ | |
| 4 | 2 layer, port 7-8, $n_{SCID} = 0$ | | 4 layer, port 7-10, $n_{SCID} = 0$ | |
| 5 | 2 layer, port 7-8, $n_{SCID} = 1$ | | 4 layer, port 7-10, $n_{SCID} = 0$ | |
| 6 | 3 layer, port 7-9, $n_{SCID} = 0$ | | 5 layer, port 7-11, $n_{SCID} = 0$ | |
| 7 | 4 layer, port 7-10, $n_{SCID} = 0$ | | 6 layer, port 7-12, $n_{SCID} = 0$ | |
| 8 | 1 layer, port 7, $n_{SCID} = 0$ | $n_{SCID2} = 1$ | 7 layer, port 7-13, $n_{SCID} = 0$ | |
| 9 | 1 layer, port 7, $n_{SCID} = 1$ | | 8 layer, port 7-14, $n_{SCID} = 0$ | |
| 10 | 1 layer, port 8, $n_{SCID} = 1$ | | 2 layer, port 7-8, $n_{SCID} = 0$ | $n_{SCID2} = 1$ |
| 11 | 1 layer, port 8, $n_{SCID} = 0$ | | 2 layer, port 7-8, $n_{SCID} = 0$ | |
| 12 | 2 layer, port 7-8, $n_{SCID} = 0$ | | 3 layer, port 7-9, $n_{SCID} = 0$ | |
| 13 | 3 layer, port 7-8, $n_{SCID} = 1$ | | 3 layer, port 7-9, $n_{SCID} = 0$ | |
| 14 | 1 layer, port 7, $n_{SCID} = 0$ | $n_{SCID2} = 2$ | 4 layer, port 7-10, $n_{SCID} = 0$ | |
| 15 | 1 layer, port 7, $n_{SCID} = 1$ | | 4 layer, port 7-10, $n_{SCID} = 0$ | |
| 16 | 1 layer, port 8, $n_{SCID} = 1$ | | N/A | |
| 17 | 1 layer, port 8, $n_{SCID} = 0$ | | | |
| 18 | 2 layer, port 7-8, $n_{SCID} = 0$ | | | |
| 19 | 2 layer, port 7-8, $n_{SCID} = 1$ | | | |
| 20 | 1 layer, port 7, $n_{SCID} = 0$ | $n_{SCID2} = 3$ | | |
| 21 | 1 layer, port 7, $n_{SCID} = 1$ | | | |
| 22 | 1 layer, port 8, $n_{SCID} = 1$ | | | |
| 23 | 1 layer, port 8, $n_{SCID} = 0$ | | | |
| 24 | 2 layer, port 7-8, $n_{SCID} = 0$ | | | |
| 25 | 2 layer, port 7-8, $n_{SCID} = 1$ | | | |
| 26 | 1 layer, port 7, $n_{SCID} = 0$ | $n_{SCID2} = 4$ | | |
| 27 | 1 layer, port 7, $n_{SCID} = 1$ | | | |
| 28 | 1 layer, port 8, $n_{SCID} = 1$ | | | |
| 29 | 1 layer, port 8, $n_{SCID} = 0$ | | | |
| 30 | 2 layer, port 7-8, $n_{SCID} = 0$ | | | |
| 31 | 2 layer, port 7-8, $n_{SCID} = 1$ | | | |

In Table 5, five $n_{SCID2}$ values are secured for single codeword transmission using an NDI bit for the non-activated codewords that are not used in LTE-A. Due to the fact that the transmission of one codeword on multiple layers occurs only in the case of retransmission, the $n_{SCID2}$ is extended for one or two layers in case of one codeword. Specifically, the additional $n_{SCID2}$ can be used, with the exception of the retransmission via distributed antennas after initial transmission via central antenna.

Although the number of layers for the distributed antennas is limited to 4 in Table 5, DM-RS can be generated using Table 6 when the number of layers is limited to 2.

TABLE 6

| Value | One CW | | Two CW | |
|---|---|---|---|---|
| | 1 layer, port 7, $n_{SCID} = 0$ | $n_{SCID2} = 0$ | 2 layer, port 7-8, $n_{SCID} = 0$ | $n_{SCID2} = 0$ |
| | 1 layer, port 7, $n_{SCID} = 1$ | | 2 layer, port 7-8, $n_{SCID} = 1$ | |
| | 1 layer, port 8, $n_{SCID} = 0$ | | 3 layer, port 7-9, $n_{SCID} = 0$ | |
| | 1 layer, port 8, $n_{SCID} = 1$ | | 4 layer, port 7-10, $n_{SCID} = 0$ | |
| | 2 layer, port 7-8, $n_{SCID} = 0$ | | 5 layer, port 7-11, $n_{SCID} = 0$ | |
| | 2 layer, port 7-8, $n_{SCID} = 1$ | | 6 layer, port 7-12, $n_{SCID} = 0$ | |
| | 3 layer, port 7-9, $n_{SCID} = 0$ | | 7 layer, port 7-13, $n_{SCID} = 0$ | |
| | 4 layer, port 7-10, $n_{SCID} = 0$ | | 8 layer, port 7-14, $n_{SCID} = 0$ | |
| | 1 layer, port 7, $n_{SCID} = 0$ | $n_{SCID2} = 1$ | 2 layer, port 7-8, $n_{SCID} = 0$ | $n_{SCID2} = 1$ |
| | 1 layer, port 7, $n_{SCID} = 1$ | | 2 layer, port 7-8, $n_{SCID} = 1$ | |
| 0 | 1 layer, port 8, $n_{SCID} = 1$ | | 2 layer, port 7-8, $n_{SCID} = 0$ | $n_{SCID2} = 2$ |
| 1 | 1 layer, port 8, $n_{SCID} = 0$ | | 2 layer, port 7-8, $n_{SCID} = 1$ | |
| 2 | 1 layer, port 7, $n_{SCID} = 0$ | $n_{SCID2} = 2$ | 2 layer, port 7-8, $n_{SCID} = 0$ | $n_{SCID2} = 3$ |
| 3 | 1 layer, port 7, $n_{SCID} = 1$ | | 2 layer, port 7-8, $n_{SCID} = 1$ | |
| 4 | 1 layer, port 8, $n_{SCID} = 1$ | | 2 layer, port 7-8, $n_{SCID} = 0$ | $n_{SCID2} = 4$ |
| 5 | 1 layer, port 8, $n_{SCID} = 0$ | | 2 layer, port 7-8, $n_{SCID} = 1$ | |
| 6 | 1 layer, port 7, $n_{SCID} = 0$ | $n_{SCID2} = 3$ | N/A | |
| 7 | 1 layer, port 7, $n_{SCID} = 1$ | | | |
| 8 | 1 layer, port 8, $n_{SCID} = 1$ | | | |
| 9 | 1 layer, port 8, $n_{SCID} = 0$ | | | |
| 0 | 1 layer, port 7, $n_{SCID} = 0$ | $n_{SCID2} = 4$ | | |
| 1 | 1 layer, port 7, $n_{SCID} = 1$ | | | |
| 2 | 1 layer, port 8, $n_{SCID} = 1$ | | | |
| 3 | 1 layer, port 8, $n_{SCID} = 0$ | | | |
| 4 | 1 layer, port 7, $n_{SCID} = 0$ | $n_{SCID2} = 5$ | | |
| 5 | 1 layer, port 7, $n_{SCID} = 1$ | | | |
| 6 | 1 layer, port 8, $n_{SCID} = 1$ | | | |
| 7 | 1 layer, port 8, $n_{SCID} = 0$ | | | |
| 8 | 1 layer, port 7, $n_{SCID} = 0$ | $n_{SCID2} = 6$ | | |
| 9 | 1 layer, port 7, $n_{SCID} = 1$ | | | |
| 0 | 1 layer, port 8, $n_{SCID} = 1$ | | | |

TABLE 6-continued

| Value | One CW | Two CW |
|---|---|---|
| 1 | 1 layer, port 8, $n_{SCID} = 0$ | |

Similar to Table 5, Table 6 shows additional $n_{SCID2}$ values secured using the NDI bit for non-activated codewords, which are not used for single codeword transmission in LTE-A. The additional nSCID2 values are used, with the exception of the case of the retransmission via distributed antennas after initial transmission via central antenna.

If the number of layers for the distributed antennas is limited to 1, a DM-RS can be generated using Table 7.

TABLE 7

| | One CW | | Two CW |
|---|---|---|---|
| 0 | 1 layer, port 7, $n_{SCID} = 0$ | $n_{SCID2} = 0$ | 2 layer, port 7-8, SCID = 0 |
| 1 | 1 layer, port 7, $n_{SCID} = 1$ | | 2 layer, port 7-8, SCID = 1 |
| 2 | 1 layer, port 8, $n_{SCID} = 0$ | | 3 layer, port 7-9, SCID = 0 |
| 3 | 1 layer, port 8, $n_{SCID} = 1$ | | 4 layer, port 7-10, SCID = 0 |
| 4 | 2 layer, port 7-8, $n_{SCID} = 0$ | | 5 layer, port 7-11, SCID = 0 |
| 5 | 2 layer, port 7-8, $n_{SCID} = 1$ | | 6 layer, port 7-12, SCID = 0 |
| 6 | 3 layer, port 7-9, $n_{SCID} = 0$ | | 7 layer, port 7-13, SCID = 0 |
| 7 | 4 layer, port 7-10, $n_{SCID} = 0$ | | 8 layer, port 7-14, SCID = 0 |
| 8 | 1 layer, port 7, $n_{SCID} = 0$ | $n_{SCID2} = 1$ | N/A |
| 9 | 1 layer, port 7, $n_{SCID} = 1$ | | |
| 10 | 1 layer, port 8, $n_{SCID} = 0$ | | |
| 11 | 1 layer, port 8, $n_{SCID} = 1$ | | |
| 12 | 1 layer, port 7, $n_{SCID} = 0$ | $n_{SCID2} = 2$ | |
| 13 | 1 layer, port 7, $n_{SCID} = 1$ | | |
| 14 | 1 layer, port 8, $n_{SCID} = 0$ | | |
| 15 | 1 layer, port 8, $n_{SCID} = 1$ | | |

Similar to Table 6, Table 7 shows the three additional $n_{SCID2}$ values acquired by using the NDI bit for non-activated codewords, which are not used for signal codeword transmission in LTE-A. Furthermore, Table 7 allows using three $n_{SCID2}$ values only with 3 bits, such that it is possible to provide additional DM-RS sequences in consideration of the DAS environment, without the additional bit for LTE-A.

According to this embodiment of the present invention, the initial value for the DM-RS sequence is determined using Equation (8). Function $f(n_{SCID}, n_{SCID2})$ can be a function predetermined like $n_{SCID2}*2+n_{SCID}$, or a function determined according to one or more values carried in the RRC signal transmitted from the eNB to the UE.

A function that is determined according to the RRC signal is described with reference to Table 7. The eNB transmits six values, mapped by a combination of $n_{SCID}$ and $n_{SCID2}$ to the UE, as shown in Table 7-1.

The UE checks the combination of $n_{SCID}$ and $n_{SCID2}$ scheduled through downlink control information, and determines one of the six mapping values transmitted in the RRC signal by referencing Table 7-1. The UE determines the function value $f(n_{SCID}, n_{SCID2})$ by using the values mapped to one of the six values carried in the RRC signal. The UE determines the value of $c_{init}$, used in DMRS transmission, by applying Equation (8).

In Table 3-1, each element of the ordered pair transmitted by RRC signaling in correspondence to $(n_{SCID}, n_{SCID2})$ is an integer value greater than or equal to 0. $f(n_{SCID}, n_{SCID2})$ corresponding to (X, Y) in Table 3-1 can be $f(n_{SCID}, n_{SCID2}) = (\lfloor n_s/2 \rfloor + 1) \cdot (2N_{ID}^{cell} + 2X) \cdot 2^{16} + Y$, for example. This provides the effect that the parameter $N_{ID}^{cell}$ of Equation (2), determining the value of $c_{init}$ for DM-RS of the legacy LTE-A, is substituted by X, and $n_{SCID}$ by Y. For example, $f(n_{SCID}, n_{SCID2})$, corresponding to (X, Y) in Table 3-1, can be $f(n_{SCID}, n_{SCID2}) = (\lfloor n_s/2 \rfloor + 1) \cdot (-2N_{ID}^{cell} + 2X) \cdot 2^{16} + Y$. This provides the effect that the parameter $N_{ID}^{cell}$ of Equation (2), determining the value of $c_{init}$ for DM-RS of the legacy LTE-A, is substituted by X, and $n_{SCID}$ by Y.

According to an embodiment of the present invention, the combination of (X, Y) in Table 7-1 can be provided to the UE through RRC signaling carrying only the value of X with fixed Y=$n_{SCID}$.

TABLE 7-1

| ($n_{SCID}$, $n_{SCID2}$) | (X, Y) |
|---|---|
| (0, 0) | (X0, Y0) |
| (0, 1) | (X1, Y1) |
| (0, 2) | (X2, Y2) |
| (1, 0) | (X3, Y3) |
| (1, 1) | (X4, Y4) |
| (1, 2) | (X5, Y5) |

Figure 8:
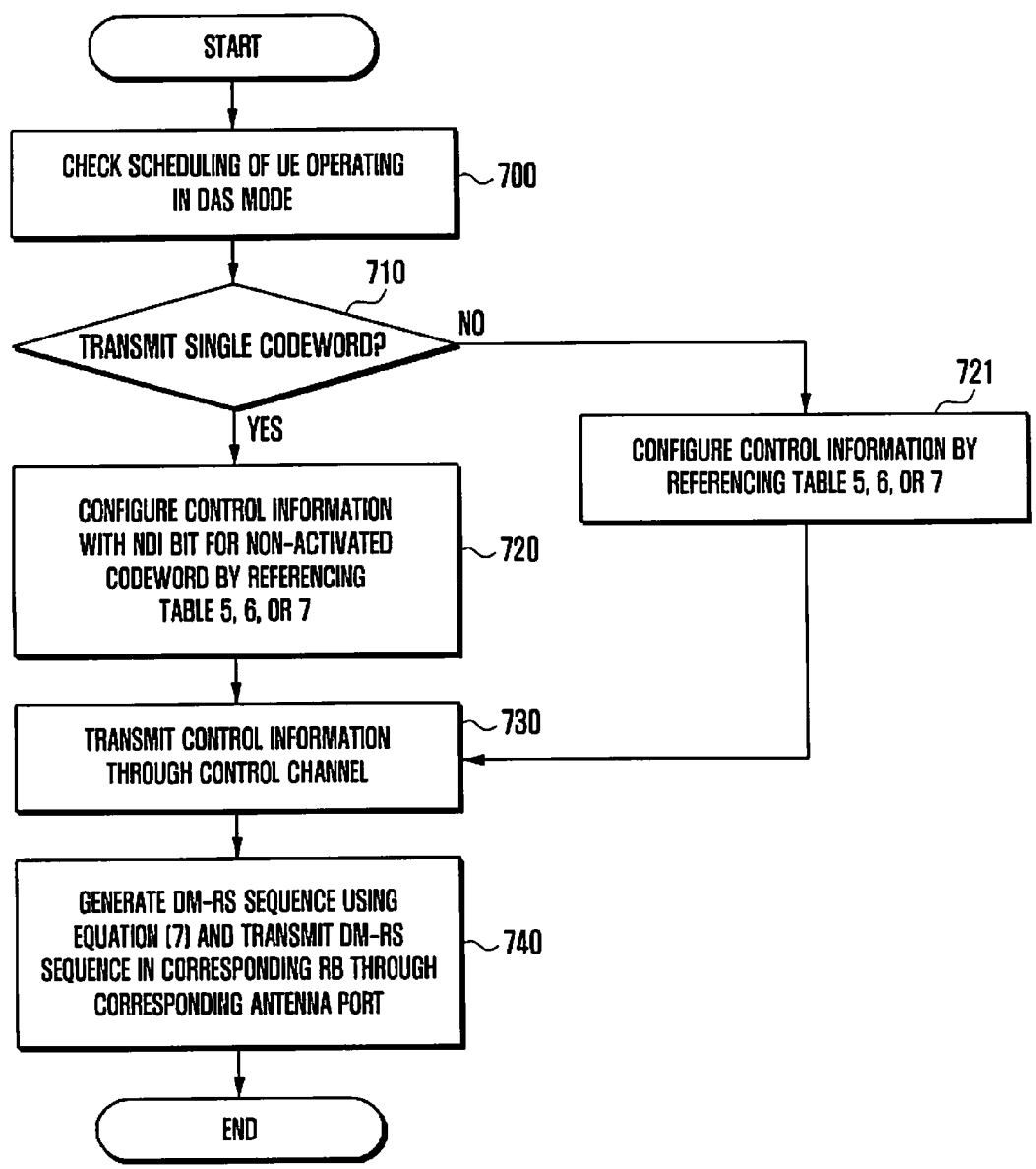
FIG. 8 is a flowchart illustrating an eNB procedure for generating a DM-RS sequence, according to an embodiment of the present invention.

FIG. 8 is a flowchart illustrating an eNB procedure for generating a DM-RS sequence, according to the embodiment of the present invention describe above with respect to FIG. 7.

Referring to FIG. 8, the eNB checks scheduling for the UE operating in the DAS mode, in step 700. Specifically, the eNB checks the UEs to be scheduled with corresponding antennas. The eNB checks the number of codewords to be transmitted to the scheduled UE, in step 710. The eNB can determine scrambling parameters for the UE in consideration of collision with other UEs using the same RB. Specifically, the eNB can configure $n_{SCID}$ and $n_{SCID2}$ as scrambling parameters. If it is determined that the number of codewords is 1, the eNB configures control information with an NDI bit for the non-activated codeword by referencing Table 5, 6, or 7 in consideration of a collision with UEs using the same RB, in step 720. The eNB can check the number of layers and the antenna port for the scheduled UE. The eNB can configure the control information with the scrambling parameters, number of layers, and antenna ports. If it is determined that the number of codewords is 2, the eNB configures the control information without the NDI bit by referencing Table 5, 6, or 7 in consideration of a collision with other UEs using the same RB, in step 721.

The eNB transmits the configured control information to the UE through a control channel, in step 730. The eNB generates a DM-RS sequence for the UE using Equation (7), and transmits the DM-RS sequence through the corresponding RB and through a corresponding antenna port, in step 740. Specifically, the eNB combines $n_{SCID}$ and $n_{SCID2}$ values to generate and transmit the DM-RS sequence for the corresponding UE. Upon receipt of the control information, the UE checks the number of codewords to determine whether the NDI bit is included, and to check the control information by referencing Table 5, 6, or 7.

Although the embodiments of the present invention are directed to cases where the eNB combines $n_{SCID}$ with one of [$n_{RNTI}$ mod G] and $n_{SCID2}$ to generate DM-RS sequence for a UE, embodiments of the present invention are not limited thereto. Specifically, the eNB can combine the $n_{SCID}$ with [$n_{RNTI}$ mod G] and $n_{SCID2}$ to generate a DM-RS sequence. Thus, the embodiments of the present invention can be implemented with the DM-RS sequence for the UE that is generated by combining nSCID and at least one of [$n_{RNTI}$ mod G] and $n_{SCID2}$.

The DM-RS generation method according a further embodiment of the present invention differs from those of the previous embodiments in that the DM-RSs are discriminated in the DAS environment by using orthogonal resources that are not used in LTE-A, rather than adding new DM-RS sequences.

In LTE-A, the Spreading Factor (SF) of orthogonal sequence is set to 2 for the codeword transmission on 1, 2, 3, and 4 layers, and DM-RS ports 7 to 10 are used among the DM-RS ports 7 to 13. If the UE detects the DM-RS with the SF of the orthogonal sequence, which is set to 4, DM-RS ports 11 to 13 are orthogonal with DM-RS ports 7 to 10. Accordingly, by adding orthogonal resources that are not used in LTE-A in a specific layer situation after setting SF to 4 in the DAS environment, it is possible to support more distributed antennas. Specifically, the DM-RS generation method, according to this embodiment of the present invention, generates a DM-RS by referencing Table 8 after limiting the number of layers available for the distributed antennas to 4.

TABLE 8

| | One CW | Two CW |
|---|---|---|
| 0 | 1 layer, port 7, $n_{SCID} = 0$ | 2 layer, port 7-8, $n_{SCID} = 0$ |
| 1 | 1 layer, port 7, $n_{SCID} = 1$ | 2 layer, port 7-8, $n_{SCID} = 1$ |
| 2 | 1 layer, port 8, $n_{SCID} = 0$ | 3 layer, port 7-9, $n_{SCID} = 0$ |
| 3 | 1 layer, port 8, $n_{SCID} = 1$ | 3 layer, port 7-9, $n_{SCID} = 1$ |
| 4 | 2 layer, port 7-8, $n_{SCID} = 0$ | 4 layer, port 7-10, $n_{SCID} = 0$ |
| 5 | 2 layer, port 7-8, $n_{SCID} = 1$ | 4 layer, port 7-10, $n_{SCID} = 1$ |
| 6 | 3 layer, port 7-9, $n_{SCID} = 0$ | 5 layer, port 7-11, $n_{SCID} = 0$ |
| 7 | 4 layer, port 11, $n_{SCID} = 0$ | 6 layer, port 7-12, $n_{SCID} = 0$ |
| 8 | 1 layer, port 11, $n_{SCID} = 0$ | 7 layer, port 7-13, $n_{SCID} = 0$ |
| 9 | 1 layer, port 11, $n_{SCID} = 1$ | 8 layer, port 7-14, $n_{SCID} = 0$ |
| 10 | 1 layer, port 13, $n_{SCID} = 0$ | 2 layer, port 11, 13, $n_{SCID} = 0$ |
| 11 | 1 layer, port 13, $n_{SCID} = 1$ | 2 layer, port 11, 13, $n_{SCID} = 1$ |
| 12 | 2 layer, port 11, 13, $n_{SCID} = 0$ | 3 layer, port 11, 13, $n_{SCID} = 0$ |
| 13 | 2 layer, port 11, 13, $n_{SCID} = 1$ | 3 layer, port 11, 13, $n_{SCID} = 1$ |
| 14 | 3 layer, port 11-13, $n_{SCID} = 0$ | 4 layer, port 11-14, $n_{SCID} = 0$ |
| 15 | 4 layer, port 11-14, $n_{SCID} = 1$ | 4 layer, port 11-14, $n_{SCID} = 1$ |

The eNB configures the DM-RS ports and $n_{SCID}$ in consideration of UEs scheduled simultaneously by referencing Table 8, and transmits 4-bit control information to the UE and then DM-RS through the corresponding port. The UE sets SF to 4 in a DAS mode to receive the DM-RS.

Figure 9:
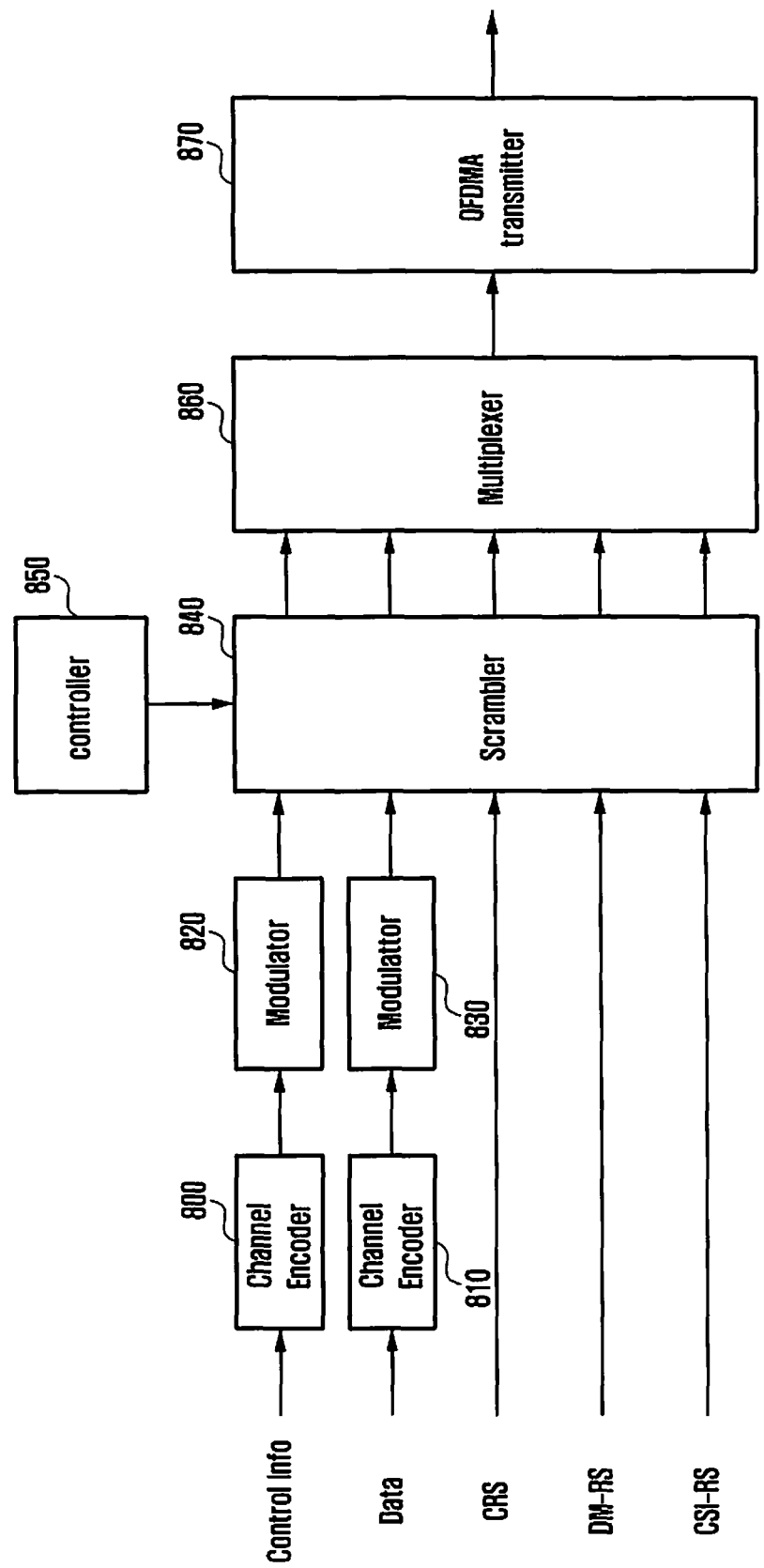
FIG. 9 is a DM-RS sequence generation device of the eNB, according to an embodiment of the present invention.

FIG. 9 is a DM-RS sequence generation device of the eNB, according to an embodiment of the present invention.

Referring to FIG. 9, the eNB includes channel encoders 800 and 810, modulators 820 and 830, a scrambler 840, a controller 850, a multiplexer 860, and a transmitter 870.

The channel encoders 800 and 810 perform channel encoding on the control information and data, respectively. The modulators 820 and 830 modulate the channel coded signals with a modulation scheme such as QPSK, 16QAM, and 64QAM. The scrambler 840 performs scrambling on the signal with a corresponding scrambling sequence in a subframe. The scrambling sequence is determined depending on the initial value of the signal. The controller 850 determines the initial value of the scrambling sequence per signal. The controller 850 transfers the initial value of the scrambling sequence per signal to the scrambler 840. The signals are transmitted in units of subframes in the OFDMA scheme. Although the multiplexer 860 is connected to the output end of the scrambler 840 in this embodiment of the present invention, embodiments of the present invention are not limited thereto. Specifically, the present invention can be implemented by arranging the multiplexer 860 before the scrambler 840'.

The controller 850 determines at least two scrambling parameters for the respective UEs that match with a plurality of antennas distributed in the service area of the eNB. The controller 850 checks the UEs scheduled that match with the antennas. The controller 850 configures [$n_{RNTI}$ mode G] obtained using $n_{RNTI}$ of the UE and mode G and/or $n_{CSID}$ as scrambling parameter, according to the embodiment of the present invention described with respect to FIG. 6. The controller 850 can determine the scrambling parameters that match with the UE in consideration of other UEs using the same RB, according an embodiment of the present invention described with respect to FIG. 7 or FIG. 8. The controller 850 also can determine the number of codewords to be transmitted to the UE, according to the embodiment of the present invention described with respect to FIG. 8. If the number of codeword is 1, the controller 850 can determine the scrambling parameters using NDI bit of the deactivated codeword.

The scrambler 840 generates DM-RS sequences for respective antennas by combining scrambling parameters. The scrambler 840 can check the number of layers and antenna ports for the UE and determine the control information based on the scrambling parameters, number of layers, and antenna ports, according to an embodiment of the present invention.

Transmitter 870 transmits the DM-RS sequences through corresponding antennas. If the control information is configured by the sequence generator, the transmitter 870 transmits the control information to the UE.

Some of the antennas can use the resources that are orthogonal with the rest. When an antenna for use by a certain UE uses the orthogonal resource, the controller 850 transmits the control signal for resetting a value of SF from 2 to 4 to the UE, such that the UE can receive the DM-RS sequence according to this embodiment of the present invention. Specifically, the DM-RS ports of the antenna for the UE are antenna ports 11 to 13, and the controller 850 transmits the control signal instructing to set SF to 4.

Figure 10:
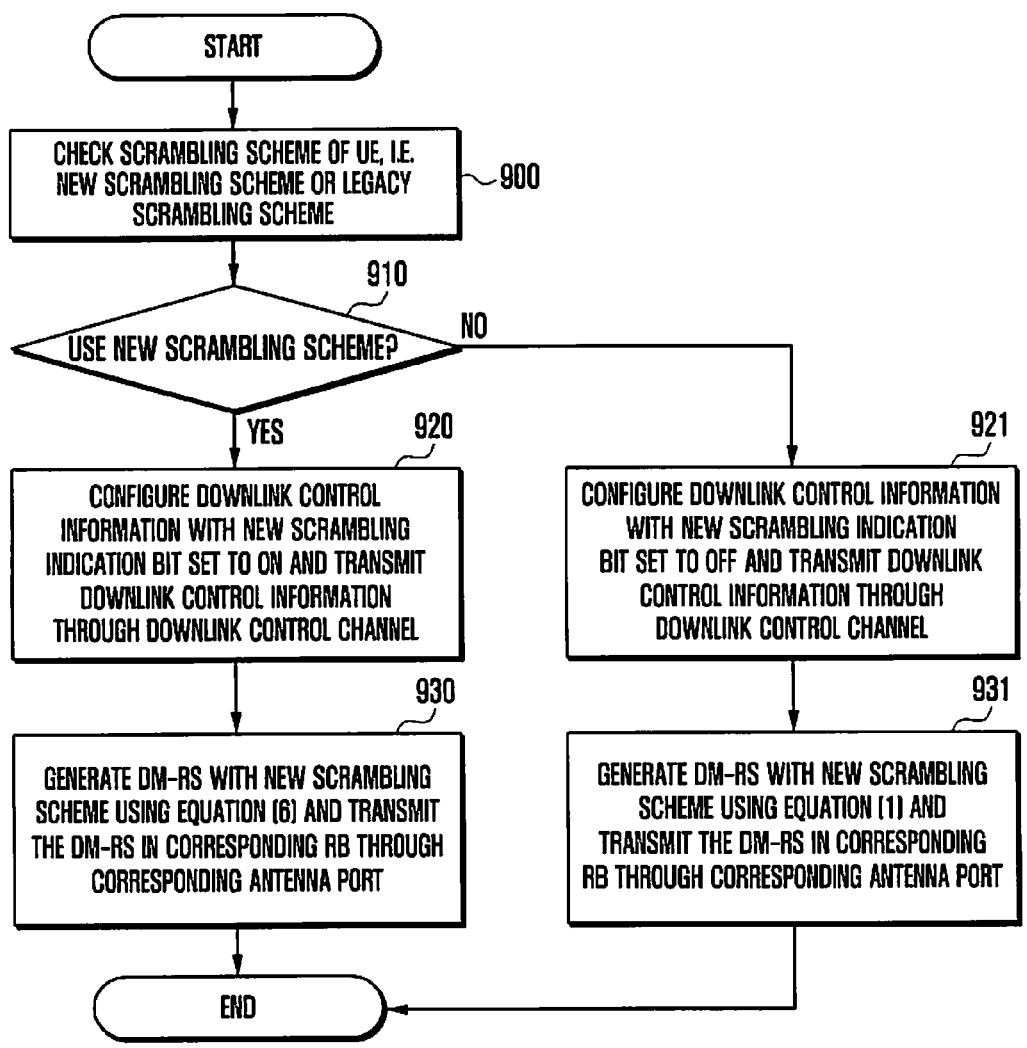
FIG. 10 is a flowchart illustrating an eNB procedure for generating a DM-RS by switching between a new scrambling scheme and a legacy scrambling scheme, according to an embodiment of the present invention.

FIG. 10 is a flowchart illustrating an eNB procedure for generating a DM-RS by switching between a new scrambling scheme and a legacy scrambling scheme, according to an embodiment of the present invention.

Referring to FIG. 10, the eNB checks the scrambling scheme, i.e., the new scheduling scheme or the legacy scheduling scheme, to be used by the scheduled UE, in step 900. In step 910, it is determined whether a new scrambling scheme is used. If it is determined that the UE uses the new scrambling scheme, the eNB sets a bit for indicating the new scrambling scheme to 'ON' in downlink control information, and transmits the control information on the downlink control channel, in step 920.

The eNB transmits the DM-RS generated with the new scrambling scheme using Equation (6) to the UE in a corresponding RB through a corresponding antenna port along with downlink data, in step 930. If it is determined that the UE uses the legacy scrambling scheme at step 910, the eNB sets the bit for indicating the new scrambling scheme to 'OFF' in downlink control information and transmits the control information on the downlink control channel, in step 921. The eNB transmits the DM-RS generated with the legacy scrambling scheme using Equation (1) to the UE in the corresponding RB through a corresponding antenna port along with the downlink data, in step 931.

The UE checks the scrambling scheme indication bit, and, if it is set to ON, receives the DM-RS with Equation (6) to estimate the channel and recover the data. Otherwise, if it is set to OFF, the UE receives the DM-RS with Equation (1) to estimate the channel and recover the data.

Figure 11:
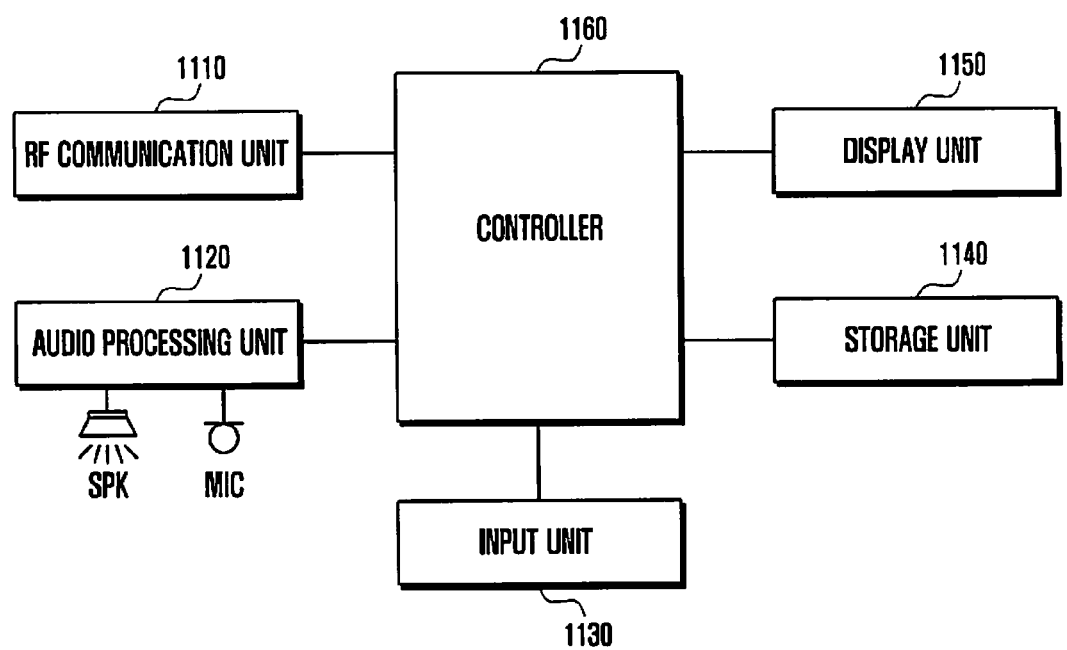
FIG. 11 is a block diagram illustrating a configuration of a UE for receiving reference signals transmitted by an eNB, according to an embodiment of the present invention.

FIG. 11 is a block diagram illustrating a configuration of a UE for receiving reference signals transmitted by an eNB, according to an embodiment of the present invention.

As shown in FIG. 11, the UE according to an embodiment of the present invention includes a radio communication unit 1110, an audio processing unit 1120, an input unit 1130, a display unit 1150, a storage unit 1140, and a control unit (or controller) 1160.

The radio communication unit 1110 is responsible for transmitting/receiving radio signals carrying data. Particularly, in an embodiment of the present invention, the radio communication unit 1110 can receive the control information including at least two scrambling factors combinations of at least two scrambling factors through Radio Resource Control (RRC) signaling. The radio communication unit 1110 also can receive the control information, instructing use of one of the scrambling factor combinations through a Physical Downlink Control Channel (PDCCH).

The control unit 1160 controls overall operations of the function blocks of the UE. Particularly, in an embodiment of the present invention, the control unit 1160 of the UE selects one of the scrambling factors combinations based on the control information received by the radio communication unit 1110.

The control unit 1160 also calculates the initial value of the demodulation reference signal sequence using the selected combination, and controls receiving the demodulation reference signal sequence using the initial value.

As described above, the DAS of a cellular mobile communication system distributes a plurality of antennas within the service area of an eNB to improve the quality of the mobile communication service. Also, the DM-RS generation method and apparatus of embodiments of the present invention employ DAS, which distributes a plurality of antennas of an eNB within the eNB's service area and generates the DM-RS to maximize RS resource utilization in the DAS environment. The cellular mobile communication system of embodiments of the present invention is capable of generating and transmitting the DM-RS efficiently through central and distributed antennas so as to provide the UE with a higher data rate communication service regardless of a UE's location in the cell.

While the invention has been shown and described with reference to certain embodiments thereof, it will be understood by those skilled in the art that various changes in form and detail may be made therein without departing from the spirit and scope of the invention, as defined in the appended claims.

What is claimed is:

1. A method of receiving reference signals at a terminal through distributed antennas deployed within a service area of a base station in a mobile communication system, comprising the steps of:
   receiving first control information comprising at least two scrambling factor combinations from the base station;
   receiving second control information indicating one of the at least two scrambling factor combinations from the base station;
   calculating an initial value of a demodulation reference signal (DM-RS) sequence using the one of the at least two scrambling factor combinations identified based on the second control information; and
   receiving the demodulation reference signal sequence using the initial value,
   wherein the at least two scrambling factor combinations are used for generating a plurality of DM-RS sequences, and a resource for the DM-RS sequence is allocated to a layer using a corresponding antenna port in a same resource block (RB).

2. The method of claim 1, wherein the second control information indicates the one of the at least two scrambling factor combinations to be used based on whether another terminal uses the same RB, a number of layers of the terminal, and antenna ports for the terminal.

3. The method of claim 1, wherein the one of the at least two scrambling factor combinations comprises a New Data Indicator (NDI) bit of a deactivated codeword when a number of codewords transmitted to the terminal is 1.

4. The method of claim 3, wherein the first control information is transmitted through a Radio Resource Control (RRC) signal, and the second control information is transmitted through a Physical Downlink Control Channel (PDCCH).

5. A method for transmitting reference signals from a base station and through distributed antennas deployed within a service area of the base station in a mobile communication system, comprising the steps of:
  transmitting, to a terminal, first control information comprising at least two scrambling factor combinations;
  transmitting, to the terminal, second control information indicating one of the at least two scrambling factor combinations;
  generating a demodulation reference signal (DM-RS) sequence using the one of the at least two scrambling factor combinations; and
  transmitting the demodulation reference signal sequence to the terminal,
  wherein the at least two scrambling factor combinations are used for generating a plurality of DM-RS sequences, and a resource for the DM-RS sequence is allocated to a layer using a corresponding antenna port in a same resource block (RB).

6. The method of claim 5, wherein the second control information indicates the one of the at least two scrambling factor combinations to be used based on whether another terminal uses the same RB, a number of layers of the terminal, and antenna ports for the terminal.

7. The method of claim 6, wherein the one of the at least two scrambling factor combinations comprises a New Data Indicator (NDI) bit of a deactivated codeword when a number of codewords transmitted to the terminal is 1.

8. The method of claim 7, wherein the first control information is transmitted through a Radio Resource Control (RRC) signal, and the second control information is transmitted through a Physical Downlink Control Channel (PDCCH).

9. A terminal for receiving reference signals transmitted by a base station through distributed antennas deployed within a service area of the base station in a mobile communication system, comprising:
  a radio communication unit which receives first control information comprising at least two scrambling factor combinations and second control information indicating one of the at least two scrambling factor combinations from the base station; and
  a control unit which calculates an initial value of a demodulation reference signal (DM-RS) sequence using the one of the at least two scrambling factor combinations identified based on the second control information, and receives the demodulation reference signal sequence using the initial value,
  wherein the at least two scrambling factor combinations are used for generating a plurality of DM-RS sequences, and a resource for the DM-RS sequence is allocated to a layer using a corresponding antenna port in a same resource block (RB).

10. The terminal of claim 9, wherein the second control information indicates the one of the at least two scrambling factor combinations to be used based on whether another terminal uses the same RB, a number of layers of the terminal, and antenna ports for the terminal.

11. The terminal of claim 10, wherein the one of the at least two scrambling factor combinations comprises a New Data Indicator (NDI) bit of a deactivated codeword when a number of codewords transmitted to the terminal is 1.

12. The terminal of claim 11, wherein the first control information is transmitted through a Radio Resource Control (RRC) signal, and the second control information is transmitted through a Physical Downlink Control Channel (PDCCH).

13. A base station for transmitting reference signals through distributed antennas deployed within a service area of the base station in a mobile communication system, comprising:
  a control unit which generates first control information comprising at least two scrambling factor combinations and second control information indicating one of the at least two scrambling factor combinations, and generates a demodulation reference signal (DM-RS) sequence using the one of the at least two scrambling factor combinations; and
  a transmitter that transmits the first control information, the second control information, and the demodulation reference signal sequence to the terminal,
  wherein the at least two scrambling factor combinations are used for generating a plurality of DM-RS sequences, and a resource for the DM-RS sequence is allocated to a layer using a corresponding antenna port in a same resource block (RB).

14. The base station of claim 13, wherein the second control information indicates the one of the at least two scrambling factor combinations to be used based on whether another terminal uses the same RB, a number of layers of the terminal, and antenna ports for the terminal.

15. The base station of claim 14, wherein the one of the at least two scrambling factor combinations comprises a New Data Indicator (NDI) bit of a deactivated codeword when a number of codewords transmitted to the terminal is 1.

16. The base station of claim 15, wherein the first control information is transmitted through a Radio Resource Control (RRC) signal, and the second control information is transmitted through a Physical Downlink Control Channel (PDCCH).

* * * * *